Patented Apr. 2, 1940

2,195,581

UNITED STATES PATENT OFFICE 2,195,581

DETERGENT AND METHOD OF MAKING IT

John Ross, New York, N. Y., assignor to Colgate-Palmolive-Peet Company, Jersey City, N. J., a corporation of Delaware No Drawing. Application July 9, 1937,
Serial No. 152,829

18 Claims. (Cl. 260—513)

This invention relates to a novel process for preparing wetting, deterging and emulsifying agents and more particularly to the production of certain organic halide hydroxy sulphonates, polyhalide organic sulphonates and/or polyhydroxy organic sulphonates which are useful as detergents etc., or intermediates in the preparation thereof.

Numerous substituted sulphonated compounds have been dscribed, some of which are especially efficient as wetting, cleaning and emulsifying agent, but they are usually expensive and difficult to prepare. A simple and economical method has now been discovered for the production of certain sulphonated materials which are useful as wetting, cleaning and/or emulsifying compounds, or intermediates in the preparation of such compounds.

More specifically, the present invention is directed to the preparation of effective sulphonated wetting and emulsifying agents and intermediates from olefine halides. When unsubstituted olefine halides having between 3 and 20 carbon atoms, preferably between 3 and 8 carbon atoms, inclusive, and preferably of the type represented by allyl chloride are treated with oleum, chlorsulphonic acid or sulphur trioxide and the resulting product neutralized and treated with caustic alkali solution under certain conditions, a chlor hydroxy sulphonate or a dichlor sulphonate is obtained which can be converted into a dihydroxy sulphonate, if desired.

The source of the specific olefine halide used in the process is immaterial; allyl chloride, for example, may be obtained by treating propylene derived from cracking gases, in accordance with Patent 1,477,047 to Harry Essex et al.

According to the preferred procedure an olefine halide having the halogen substituted on a carbon adjacent to a carbon having an olefine linkage, is dissolved in a solvent which is stable to the sulphonating agent. Examples of suitable solvents are: chloroform, carbon tetrachloride and ethylene dichloride. However, liquid sulphur dioxide is the most desirable solvent since it effects increased yields of products with better color and odor than can be obtained by using other solvents. The use of a solvent minimizes side reactions such as oxidation and polymerization, and therefore produces superior products to those obtained without using a solvent. When using liquid sulphur dioxide, the reaction is conducted either at a relatively low temperature ($-10°$ C. or lower) or under increased pressure or both.

The solution of olefine halide held at a temperature of about $-10°$ C. and at atmospheric pressure (or at a slightly higher temperature and under increased pressure) is treated with a sulphonating agent, preferably a solution of sulphur trioxide in liquid sulphur dioxide; either by the addition of the halogen substituted olefine solution to the sulphonating agent or vice versa.

The quantity of sulphur trioxide or oleum should be equivalent to one mole of sulphur trioxide ($S_2O_6$) for each mole of the halogen substituted olefine. Chlorsulphonic acid which will react at the double bond of an olefine may also be used. During the mixing of the olefine halide solution with the sulphonating agent and the subsequent reaction period the mixture is constantly agitated. When operating under pressure, at no time should the temperature of the mixture rise above 10° C. A jacketed autoclave provided with a stirring device, thermometer and pressure gauge is desirable for conducting the reaction when using pressure since it permits close control of the conditions of the reaction.

The reaction proceeds smoothly for about one hour and at the finish a halogen-alkyl substituted carbyl sulphate is formed which may or may not crystallize from the solution.

The sulphur dioxide is removed as a vapor by increase of the temperature to about $+5°$ C. and by release of the pressure. The sulphur dioxide free material is mixed with about three times its volume of ice water, keeping the temperature below $20°$ C. to avoid discoloration of the product. This solution is then boiled for fifteen minutes to an hour, and the substituted carbyl sulphate formed by sulphonation is thus converted to an alkyl halide hydroxy sulphonate. The alkyl halide from the solution as the free sulphonic acid or neutralized with caustic alkali or lime. The yield is in the range of 80% of the theoretical.

The halogen substituted alkyl hydroxy sulphonic acid or salts thereof may be converted into an alkyl polyhydroxy sulphonate by adding it to water containing around 5 to 20% of an alkali such as caustic soda and boiling the combined solution for about one hour. This solution is neutralized with dilute sulphuric acid and may be concentrated until the inorganic salts are removed by crystallization. The final mother liquor contains the alkyl polyhydroxy sodium sulphonate which can be extracted therefrom by any suitable solvent such as butyl alcohol.

The following specific examples are given for a better understanding of the invention.

EXAMPLE I

*Propane 1-chloro 2-hydroxy 3-sodium sulphonate.*—To a solution of 80 parts of sulphur trioxide in 300 parts of liquid sulphur dioxide in a Dewar flask was gradually added, with stirring, a solution of 38 parts of allyl chloride in 250 parts of liquid sulphur dioxide contained in another Dewar flask. The reaction proceeded very smoothly and at the finish there were deposited prism-shaped crystals of the substituted carbyl sulphate from the amber yellow solution. The temperature throughout the reaction was −10° C.

The sulphur dioxide was distilled off, the residue taken up in ice water and the solution raised to the boiling point while being partially neutralized by the addition of barium carbonate until there was no further precipitation of barium sulphate. The filtrate was finally neutralized with caustic soda and concentrated until it began to crystallize. The sodium salt of propane 1-chloro 2-hydroxy 3-sulphonic acid which was deposited as shining prisms, was recrystallized from boiling dilute ethyl alcohol to remove all impurities. The yield was 78 parts or 80% of theory.

This material appears to be identical with propane 1-chloro 2-hydroxy 3-sodium sulphonate prepared by the addition of sodium bisulphite to epichlorohydrin according to the method of Darmstaedter, Liebig's Ann. Chem. 148, 126, (1868). Substituted allyl halides such as 2-methyl allyl chloride (chlorisobutylene) may be used in place of or along with the allyl chloride in this example.

EXAMPLE II

*Propane 1,2-dihydroxy 3-sodium sulphonates.*—200 parts of propane 1-chloro 2-hydroxy 3-sodium sulphonate were prepared as above and the sodium salt was dissolved in 1,000 parts of water. 50 parts of caustic soda were added and the solution boiled one hour. After neutralization with dilute sulphuric acid the solution was concentrated and the inorganic salts removed by crystallizing out and filtering off. The mother liquid containing the propane dihydroxy sodium sulphonate was further concentrated and the product obtained as a solid crystalline mass which melted below 100° C.

EXAMPLE III

*Di-chloro-propane sodium sulphonate.*—To 38 parts of allyl chloride dissolved in 200 parts of liquid sulphur dioxide in a Dewar flask were gradually added with stirring, 58 parts of chlorosulphonic acid. Reaction proceeded very smoothly and was complete within a half hour. The temperature was maintained at −10° C. The sulphur dioxide was distilled off and the residue was taken up in about five volumes of ice water and the product boiled 20 minutes and neutralized with caustic soda. Upon concentration, 100 parts of crystalline di-chloro-propane sodium sulphonate were obtained.

EXAMPLE IV

*Propane di-hydroxy sodium sulphonate.*—200 parts of the di-chloro-propane sodium sulphonate were treated with caustic soda according to the procedure in Example II and yielded substantially the theoretical quantity of propane dihydroxy sodium sulphonate.

EXAMPLE V

*Hexadecane chloro, hydroxy sodium sulphonate.*—258 parts of chloro-hexadecene were slowly added over a period of one half hour to a solution of 160 parts of sulphur trioxide in 1000 parts of liquid sulphur dioxide. The solution was vigorously agitated during the mixing and subsequent reaction period which was about one hour. The temperature was held at −10° C.

When the reaction was completed, the temperature was permitted to rise to +5° C. thus removing the sulphur dioxide from the reaction products. Ice water was slowly added while holding the temperature below 20° C. until the liquid separated into two layers. After removing the oily layer the mixture was then washed with a low boiling solvent such as ethyl ether and the ether layer separated from the water layer containing the water-soluble chloro-substituted hexadecane hydroxy sulphonic acid. The latter solution was boiled and then neutralized with caustic soda. The water solution of the hexadecane chloro, hydroxy sodium sulphonate was then extracted with a suitable solvent, for example, butyl alcohol. This compound and usually those which contain at least 12 carbon atoms can be used directly as an emulsifying or derging agent.

Other halogen substituted olefines such as chloro-8-dodecene-6 and chloro-3 hexadecene-1, can be used in place of or in combination with the chloro-1 hexadecene-2.

EXAMPLE VI

*Dihydroxy hexadecane sodium sulphonate.*—The chloro hexadecane hydroxy sodium sulphonate prepared as above was treated with a boiling caustic soda solution according to the procedure outlined in Example II to form the dihydroxy hexadecane sodium sulphonate.

The halogen substituted aliphatic hydroxy sulphonates can be reacted with alkali salts of organic or inorganic acids to form the corresponding esters such as the phosphates, borates, oleates, stearates, phthalates, oxalates, succinates and maleates. The polyhydroxy aliphatic sulphonates can similarly be converted into the esters of the organic acids by use of the corresponding acid, acid chloride or acid anhydride.

While the above outlined process is preferably directed to the use of halogen substituted mono-olefine hydrocarbons of the allyl halide type including those having straight and branched chain and cyclic saturated hydrocarbon radicals substituted on the allyl halide nucleus, it is within the contemplation of this invention to use any mono- or poly-halogen substituted olefine hydrocarbon whether straight or branched chain or having alicyclic substitutions thereon.

I claim:

1. A process for producing alkyl hydroxy sulphonates which comprises treating a halogen substituted olefine with a strong acidic sulphonating agent, diluting with water, boiling the dilute water solution and treating with strong alkali to yield a polyhydroxy alkyl sulphonate.

2. A process for producing alkyl halide sulphonates which comprises treating an organic halide of the group consisting of straight and branch chain olefine mono- and polyhalides, and alicyclic olefine mono- and polyhalides, with a strong sulphonating agent.

3. A process for producing halogen substituted alkyl hydroxy sulphonates which comprises treating a liquid sulphur dioxide solution of an olefine halide with a strong sulphonating agent, removing SO₂, diluting with water and boiling the water solution.

4. A process for producing a chlorhydrin sulphonic act which comprises treating allyl chloride with a liquid sulphur dioxide solution of sulphur trioxide, removing SO₂, diluting with water and boiling the water solution.

5. A process for preparing sulphonated detergents which comprises treating an olefine halide containing at least 12 carbon atoms in which the halogen substituent is on a carbon atom adjacent to a carbon having an olefine group, with a strong acidic sulphonating agent, diluting with water, boiling the water solution and neutralizing with alkali to form a long chain alkyl sulphonate having at least two substituents from the group consisting of hydroxyl and halide radicals.

6. A process for preparing alkyl halide hydroxy sulphonates which comprises sulphonating with a sulphonating agent of the group consisting of oleum, sulphur trioxide and chlor-sulphonic acid, an olefine halide in which the halogen substituent is on a carbon atom other than those having an olefine linkage, diluting with water and boiling the water solution.

7. A process of preparing beta methyl glycerol sulphonates which comprises reacting 2 methyl allyl chloride with chlor-sulphonic acid, diluting with water, boiling the water solution and treating with strong alkali to hydrolyze the halogen substituents.

8. An alkyl halide hydroxy sulphonate containing at least 12 carbon atoms.

9. An alkyl dihydroxy mono-sulphonate containing at least 12 carbon atoms.

10. An alkyl halide hydroxy sulphonate containing at least 12 carbon atoms in which the halogen, hydroxy and sulphonate groups are on consecutive carbons atoms.

11. An alkyl dihydroxy mono-sulphonate containing at least 12 carbon atoms in which the hydroxy and sulphonate groups are on consecutive carbon atoms.

12. A process for preparing polyhalogen substituted sulphonates which comprises treating a halogen substituted olefine with a halogen sulphonic acid.

13. A process for producing a halogen substituted propane sulphonic acid which comprises treating allyl halide with a strong sulphonating agent.

14. A polyhalogen substituted alkyl sulphonate having a greater number of halogen substituents than sulphonate radicals.

15. An alkyl polyhydroxy sulphonate having at least 12 carbon atoms and a greater number of hydroxyl groups than sulphonate radicals.

16. A polysubstituted alkyl sulphonate having at least 12 carbon atoms and having a number of radicals of the class consisting of halogen and hydroxy groups in excess of the number of sulphonate radicals.

17. A polyhalogen substituted alkyl sulphonate having at least 12 carbon atoms and having a greater number of halogen substituents than sulphonate radicals.

18. A process for preparing polysubstituted alkyl sulphonates which comprises treating a halogen substituted olefine with a strong acidic sulphonating agent.

JOHN ROSS.

CERTIFICATE OF CORRECTION.

Patent No. 2,195,581.  April 2, 1940.

JOHN ROSS.

It is hereby certified that error appears in the printed specification of the above numbered patent requiring correction as follows: Page 1, first column, line 10, for "dscribed" read --described--; line 12, for "agent" read --agents--; and second column, line 37, after "halide" insert --hydroxy sulphonate may either be separated--; page 2, first column, line 36, for "sulphonates" read sulphonate; page 3, first column, line 4, for "act" read --acid--; and that the said Letters Patent should be read with this correction therein that the same may conform to the record of the case in the Patent Office.

Signed and sealed this 25th day of June, A. D. 1940.

(Seal)  Henry Van Arsdale,
Acting Commissioner of Patents.

CERTIFICATE OF CORRECTION.

Patent No. 2,195,581. April 2, 1940.

JOHN ROSS.

It is hereby certified that error appears in the printed specification of the above numbered patent requiring correction as follows: Page 1, first column, line 10, for "dscribed" read --described--; line 12, for "agent" read --agents--; and second column, line 37, after "halide" insert --hydroxy sulphonate may either be separated--; page 2, first column, line 36, for "sulphonates" read sulphonate; page 3, first column, line 4, for "act" read --acid--; and that the said Letters Patent should be read with this correction therein that the same may conform to the record of the case in the Patent Office.

Signed and sealed this 25th day of June, A. D. 1940.

(Seal)

Henry Van Arsdale,
Acting Commissioner of Patents.